3,208,817
METHOD OF DISSOLVING PLUTONIUM WITH SULFAMIC ACID
William J. Jenkins, North Augusta, S.C., assignor to the United States of America as represented by the United States Atomic Energy Commission
No Drawing. Filed July 27, 1962, Ser. No. 213,062
8 Claims. (Cl. 23—14.5)

The invention relates to a novel method of dissolving plutonium, more particularly to an economical method of dissolving plutonium metal in comparatively large shapes such as single masses of 1 to 3 kilograms.

The dissolution of plutonium metal is required in various nuclear fuel processes, for example, as a preliminary step to solvent extraction. However, up until the present invention no practical method has become conventional for dissolving plutonium that does not require expensive equipment lined with noble metal, such as platinum, to resist the corrosive action of the $HNO_3$-HF solvent mixture that has been used heretofore. While HCl, and of course, HF alone dissolve plutonium, they also dissolve, as does the acid mixture previously mentioned, stainless steel as well. It is true that HCl, unlike HF and the $HNO_3$-HF mixture mentioned, is not corrosive to glass but the extremely high toxicity of plutonium militates against the use of equipment having the risk of breakage which is inherent in glass.

None of the common acids which can be contained by stainless steel are considered to be capable of dissolving plutonium, a fact that is especially unfortunate since from the standpoints of strength, workability and all-around economy, stainless steel is the ideal material for use in a plutonium handling facility. Neither nitric nor sulfuric acids, even when as highly concentrated as 13 M, are able to affect plutonium metal to more than a negligible extent.

It is, accordingly, the general object of the invention to provide a novel method of dissolving plutonium.

It is a more particular object to provide a method of dissolving plutonium in a solvent which can be contained by stainless steel.

Other objects will appear as the description proceeds.

In accordance with the present invention plutonium metal is dissolved by intimately contacting same with aqueous sulfamic acid, and maintaining the contact while the plutonium sustains destructive attack and dissolution. Even in relatively low aqueous concentration, it has been found that rapid and quite complete dissolution is readily affected. In its ability to serve thus as an effective acid solvent for plutonium admitting of practice in commonplace stainless steel apparatus, sulfamic acid is seen to be exceptional in contemporary experience. It is remarkable and largely inexplicable that in the molecular structure of sulfamic acid, the substitution of an amino group for a hydroxyl group on sulfuric acid brings about this peculiar result; in general, this substitution results in a reduction in the ionization constant, equivalent conductance and other acid properties, rather than an increase. However, in this instance the amine function seems to impart to sulfamic acid an unexpected potency with respect to plutonium, although said amino group generally causes the acid to be much less effective in attacking metals than sulfuric acid. This can be seen from the following Table I in which the relative rates of corrosion of respective 3% aqueous solutions of sulfuric and of sulfamic acids on various metals are compared, it being understood that the rate of corrosion of sulfamic acid is to be considered as being equal to unity in every case:

TABLE I.—RELATIVE CORROSION RATES OF 3% AQUEOUS SOLUTIONS OF ACIDS AT 72°±4° F. SULFAMIC ACID=1.0

| Metal: | Sulfuric acid |
|---|---|
| 1010 Steel | 2.6 |
| Cast iron | 3.2 |
| Galvanized iron | 63 |
| Tin plate | 81 |
| 304 Stainless | 10 |
| Zinc | 2.2 |
| Copper | 1.5 |
| Brass | 1.5 |
| Bronze | 4.0 |

In further accordance with the present invention, incorporating the sulfamic acid in aqueous nitric acid also affords quite effective dissolution of plutonium. The function of the acid is evidently quite synergistic, since it has been found that including just a little sulfamic acid can result in fast and thorough dissolving of the plutonium in the aqueous nitric acid system. In such application, the aqueous sulfamic acid is deemed to serve not only as an efficient solvent for plutonium in its own right, but also as an effective promoter, or synergistic agent, acting to enable and accelerate practical attack upon plutonium by the nitric acid.

In the case where aqueous sulfamic acid is used alone as a solvent for plutonium, the reaction appears to be quite straightforward and quantitative, in accordance with the following equation:

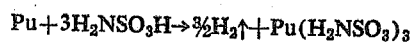

$$Pu + 3H_2NSO_3H \rightarrow \tfrac{3}{2}H_2\uparrow + Pu(H_2NSO_3)_3$$

In addition to the stoichiometric quantity of acid needed to dissolve the desired amount of plutonium, a substantial excess of the sulfamic acid should, of course, best be provided in order that the reaction may proceed promptly to completion. In order to attain a reasonably fast reaction rate sulfamic acid concentrations of at least around one molar are preferred. Inasmuch as the room temperature solubility limit of sulfamic acid is 18 weight percent (approximately 2 M) it is sometimes convenient toward maximizing the ultimate plutonium concentration in solution to incorporate comminuted solid sulfamic acid at the start in excess over the solubility limit, such that same will gradually dissolve as the reaction proceeds. Solid sulfamic acid may also be added periodically as the reaction proceeds. Maintaining a concentration of about 1.7 molar throughout the reaction is the apparent optimum.

When the sulfamic acid is incorporated in aqueous nitric acid as the acid solvent, concentrations of nitric acid of at least one molar are particularly preferred. In such case, sulfamic acid concentration of a mere minor fraction of one molar have been found effective.

As a special point, it has been found advantageous to conduct the dissolution at fairly cool temperatures. Beginning at about 50° C. decomposition of aqueous sulfamic acid into sulfuric acid begins, resulting usually in the progressive depletion of the sulfuric acid content of the aqueous medium, but also in the appearance of a plutonium sulfate sludge. Since the reactions of dissolution are well exothermic ($\Delta H = 141.9$ kcal./mol Pu), it is preferable to start the reactions with the system unheated, and preferably to cool the aqueous acid as they proceed, as with a cooling coil.

Temperatures maintained at or below 40° C. generally prove amply low to avoid any significant difficulty in that respect.

Basically the dissolution is effected simply by intimately contacting the plutonium with applicant's sulfamic acid solvent, commonly by complete immersion of all plutonium from the outset. Normally, when in the concentrations heretofore mentioned as preferred the sulfamic acid solvent serves to attack the plutonium metal quite vigorously, such that the plutonium all in a single mass will be dissolved with practical rapidity. However, for even faster results, the plutonium may be finely subdivided, in a shape of large surface area such as turnings; in proceeding in such fashion though, greater attention to maintaining the more rapidly reacting system cool is usually advisable.

With a view to determining the effectiveness of the method of the invention under different conditions, various aqueous acid solvents of relevance to the present invention were placed in separate vessels, wherein individual masses of plutonium clearly in excess of the stoichiometric capacities of the solvents, were immersed as described in the following Example I. In this way the plutonium dissolved serves as an indicative measure of the capability and amount of efficiency of the solvent.

*Example I*

Four separate flasks received a charge of plutonium metal, in each case at least approximately 100 grams, and into each was placed an aqueous solvent. Table II below lists the flasks, numbered 1 through 4, the respective metal charge and solvent:

TABLE II

| Flask No. | Amount | Solvent | |
|---|---|---|---|
| | | HNO$_3$ | H$_2$NSO$_3$H |
| 1 | Approx. ¾ liter | 5.7 M | None. |
| 2 | 750 ml | 5.7 M | 0.3 M. |
| 3 | 475 ml | 3.0 M | 1.0 M. |
| 4 | 475 ml | None | 1.7 M. |

The reactions resulting when the solvents were added to the plutonium were timed and the resulting solutions were analyzed for maximum concentration of Pu attained and total hydrogen ion consumed. The reaction in Flask No. 1 was too feeble to be observed, and the same analyses were made after 60 minutes.

The results of these analyses, together with the times and ratio of sulfamic acid to nitric acid in each solvent are now set forth in Table III:

A comparison of the ratios of sulfamic acid to nitric acid in the solutions with the other data in the table is suggestive. In Flask No. 2, 0.3 M sulfamic acid in 750 ml. is equivalent $$\frac{750}{1000} \times 0.3 \text{ moles of sulfamic acid}$$

or 0.22 mole. The plutonium dissolved was $$68 \text{ grams} \times \frac{750}{1000}$$

or 51 grams, which is equivalent to $$\frac{51}{239}$$

or .213 mole. Since both nitric and sulfamic acids are both monobasic and the plutonium has a valance of 3 as shown in the above equations, it would require $3 \times .213$ mole of one or the other of these monobasic acids to react with the plutonium, or 0.639 mole. Only .22 mole of sulfamic acid were present, so the difference, or .419 mole of the reaction must be attributed to the nitric acid. Hence, it must be inferred that nitric acid did the greater part of the dissolving, and since it is normally quite inert, as shown by Flask No. 1, the sulfamic must have synergized the action of the nitric acid.

Further illustration of the quantitative aspects and preferred conditions and procedures of the present process is provided by a ca. twelve-day semi-continuous plant scale run detailed in Example II.

*Example II*

534 grams of plutonium metal predominantly in the form of small chunks were added to one liter of 2.1% HNO$_3$ in a roughly beaker-shaped dissolver vessel of 2.9 liters capacity. Thereupon 1.67 N aqueous sulfamic acid was trickled into the vessel at the rate of 1.25 liters per hour. The dissolver was designed to overflow into an overflow tank of 2.5 liters capacity, thereby accommodating long continuation of the trickling of the sulfamic acid into the dissolver. Further batches of plutonium metal were introduced into the dissolver in amounts and at times as detailed hereinafter. Periodically as the overflow tank neared fullness, the resulting plutonium solution therein was drawn off through a sintered stainless steel mesh filter and accepted as a product. A small amount of sludge which was held back by the filter at each draw-off was mechanically removed to a sludge beaker. Each time a sufficient amount of the sludge—believed to comprise mainly plutonium oxide—was accumulated, it was dissolved in a mixture of HNO$_3$ and HF, and analyzed for plutonium. Upon accomplishing ca. 12 days of such operation, with occasional interruptions, the campaign was completed, after all remaining plutonium metal in the dissolver had been consumed, by

TABLE III

| Flask No. | Composition of dissolvent (M) | | Temperature (°C.) | Time (minutes) | Max. conc. Pu attained (g./l.)[a] | Percent of total hydrogen ion consumed | $\frac{\text{NH}_2\text{SO}_3\text{H}}{\text{HNO}_3}$ |
|---|---|---|---|---|---|---|---|
| | HNO$_3$ | NH$_2$SO$_3$H | | | | | |
| 1 | 5.7 | 0.0 | 25–30 | 60 | 0.7 | 0.2 | 0 |
| 2 | 5.7 | 0.3 | [b] 40–102 | [c]14 | 68 | 14 | .0526 |
| 3 | 3.0 | 1.0 | 25–59 | [c]10 | 46 | 14.5 | .333 |
| 4 | 0.0 | 1.7 | 25–40 | [c]60 | 134 | ~100 | ∞ |

[a] Calculated on the basis of Pu dissolving as Pu(III), except for the case of 5.7 HNO$_3$ where the formation of Pu(IV) was assumed.
[b] Solution was heated initially to 40° C, and dissolution was then allowed to proceed.
[c] Time at which reaction ceased.

rinsing a small amount of residual sludge from the apparatus with the sulfamic acid and finally filtering and dissolving that sludge. The product solution, as drawn off from the overflow tank, was found to range between 80 and 117 grams per liter in plutonium concentration, except during the terminal sludge rinsing when the concentration dropped to 20 grams per liter. Cumulatively, a total of 29,714 grams of plutonium was charged; only 946 grams of the plutonium was obtained as sludge. The weights and times of charging of the individual plutonium metal increments, and the weights of plutonium determined in the several batches of sludge are tabulated in Table IV below.

TABLE IV.—SEMI-CONTINUOUS 12-DAY RUN

[METAL ADDITIONS]

| Time after start of run, hours: minutes | Pu added, grams |
|---|---|
| 0:00 | |
| 4:30 | 534 |
| 7:55 | 522 |
| 9:55 | 453 |
| 11:55 | 791 |
| 16:45 | 473 |
| 20:30 | 462 |
| Unrecorded | 448 |
| 30:45 | 410 |
| 32:45 | 439 |
| 39:57 | 415 |
| 42:05 | 455 |
| 47:55 | 445 |
| Unrecorded | 459 |
| 54:45 | 449 |
| 56:45 | 568 |
| 61:30 | 419 |
| 62:48 | 445 |
| 67:44 | 508 |
| 72:52 | 646 |
| 79:30 | 556 |
| 92:44 | 543 |
| 97:15 | 549 |
| 102:00 | 540 |
| 106:58 | 544 |
| 111:15 | 549 |
| 115:45 | 561 |
| 121:45 | 609 |
| 129:55 | 504 |
| 134:45 | 719 |
| 139:45 | 569 |
| 145:55 | 591 |
| 155:51 | 422 |
| 158:15 | 420 |
| 160:25 | 485 |
| 162:30 | 354 |
| 166:45 | 473 |
| 174:30 | 504 |
| 180:25 | 564 |
| 183:45 | 754 |
| 187:95 | 516 |
| 192:25 | 532 |
| 196:25 | 498 |
| 206:30 | 471 |
| 208:30 | 565 |
| 214:35 | 569 |
| 218:35 | 561 |
| 228:08 | 559 |
| 232:05 | 503 |
| 236:25 | 492 |
| 242:35 | 541 |
| 248:30 | 548 |
| 253:45 | 506 |
| 261:25 | 652 |
| 264:05 | 527 |
| 271:30 | 470 |
| Unrecorded | 466 |
| | 587 |

[PLUTONIUM FOUND IN SLUDGE]

| Sludge batch | Grams plutonium |
|---|---|
| 1 | 17 |
| 2 | 40 |
| 3 | 56 |
| 4 | 25 |
| 5 | 16 |
| 6 | 29 |
| 7 | 14 |
| 8 | 26 |
| 9 | 27 |
| 10 | 18 |
| 11 | 13 |
| 12 | 14 |
| 13 | 42 |
| 14 | 67 |
| 15 | 21 |
| 16 | 33 |
| 17 | 33 |
| 18 | 39 |
| 19 | 54 |
| 20 | 27 |
| 21 | 35 |
| 22 | 44 |
| 23 | 53 |
| 24 | 81 |
| 25 | 49 |
| Cleanout | 73 |

It is to be understood that the invention is not to be limited by the examples given, but only by the scope of the appended claims.

What is claimed is:

1. A method of dissolving plutonium metal which comprises bringing said plutonium metal into contact with aqueous sulfamic acid maintaining said contact while said plutonium metal sustains destructive attack and dissolution and maintaining the temperature of the contacting mixture below 50° C.

2. The method of claim 1 wherein the sulfamic acid is 1.7 M.

3. The method of claim 1, wherein said dissolution is conducted in a stainless steel container.

4. A method of synergizing the dissolution of plutonium metal by nitric acid, which comprises essentially adding thereto as a synergistic agent a comparatively small amount of sulfamic acid while maintaining the temperature of said dissolution below 50° C.

5. The method of claim 4 where the ratio of the sulfamic acid synergistic agent to the nitric acid is about five percent.

6. The method of claim 4, wherein said dissolution is conducted in a stainless steel container.

7. A method of rapidly dissolving metallic plutonium in a stainless steel container comprising intimately contacting said plutonium metal with aqueous sulfamic acid in said stainless steel container, maintaining said contact while said plutonium metal sustains destructive attack and dissolution, and maintaining the temperature of said dissolution below 50° C.

8. A method of rapidly dissolving metallic plutonium in a stainless steel container comprising intimately contacting said plutonium metal with an aqueous solution at least one molar in sulfamic acid, maintaining said contact while said plutonium metal sustains destructive attack and dissolution, and maintaining the temperature of said dissolution below 50° C.

References Cited by the Examiner

UNITED STATES PATENTS 2,863,718    12/58    Overholt _____ 23—14.5

CARL D. QUARFORTH, *Primary Examiner.*

REUBEN EPSTEIN, *Examiner.*